United States Patent
Hua

(10) Patent No.: US 12,483,377 B2
(45) Date of Patent: Nov. 25, 2025

(54) ANTI-EAVESDROPPING USING SMART PILOTING, MULTIPLE TRANSMIT ANTENNAS AND TRANSMIT BEAMFORMING

(71) Applicant: The Regents of the University of California, Oakland, CA (US)

(72) Inventor: Yingbo Hua, Riverside, CA (US)

(73) Assignee: The Regents of the University of California, Oakland, CA (US)

(*) Notice: Subject to any disclaimer, the term of this patent is extended or adjusted under 35 U.S.C. 154(b) by 330 days.

(21) Appl. No.: 18/224,001

(22) Filed: Jul. 19, 2023

(65) Prior Publication Data

US 2024/0031118 A1    Jan. 25, 2024

Related U.S. Application Data

(60) Provisional application No. 63/390,539, filed on Jul. 19, 2022.

(51) Int. Cl.
   *H04L 5/16*   (2006.01)
   *H04L 5/00*   (2006.01)
   *H04L 25/02*  (2006.01)

(52) U.S. Cl.
   CPC .............. *H04L 5/16* (2013.01); *H04L 5/0048* (2013.01)

(58) Field of Classification Search
   CPC ..... H04L 5/16; H04L 5/0048; H04L 25/0204; H04L 25/0226
   See application file for complete search history.

(56) References Cited

U.S. PATENT DOCUMENTS

| | | | | |
|---|---|---|---|---|
| 2016/0285603 A1* | 9/2016 | Gu | ........................ | H04L 25/0228 |
| 2019/0372812 A1* | 12/2019 | Ma | ........................ | H04L 5/0026 |
| 2020/0052721 A1* | 2/2020 | Liu | ........................ | H04L 1/0071 |
| 2023/0082303 A1* | 3/2023 | Goto | ........................ | H04L 25/0204 |
| | | | | 370/350 |
| 2023/0318894 A1* | 10/2023 | Yuan | ........................ | H04L 27/2639 |

OTHER PUBLICATIONS

Y. Hua, "Anti-Eavesdropping Channel Estimation Using Multi-Antenna Half-Duplex Radios", IEEE Milcom 2021, San Diego, CA, Nov. 29-Dec. 2, 2021.
Y. Hua, "Advanced properties of full-duplex radio for securing wireless network," IEEE Transactions on Signal Processing, vol. 67, No. 1, pp. 120-135, 2019.

* cited by examiner

*Primary Examiner* — Harry H Kim
(74) *Attorney, Agent, or Firm* — LUMEN PATENT FIRM

(57) ABSTRACT

A method for wireless communication between a node A and a node B provides physical layer security. The node A has disjoint non-empty sets of antennas A1 and A2. The node B has disjoint sets of antennas B1 and B2, where B1 is non-empty. The method involves the steps of transmitting a first pilot signal from B using only B1; receiving the first pilot signal by the node A using A2; performing by A carrier synchronization and channel estimation based on the first pilot signal; transmitting a second pilot signal by the node A using A1; transmitting an information signal by the node A using A2; receiving the second pilot signal by the node B using both B1 and B2; performing by B carrier synchronization based on the second pilot signal; and receiving the information signal by B using both B1 and B2.

12 Claims, 6 Drawing Sheets

ANECE-2

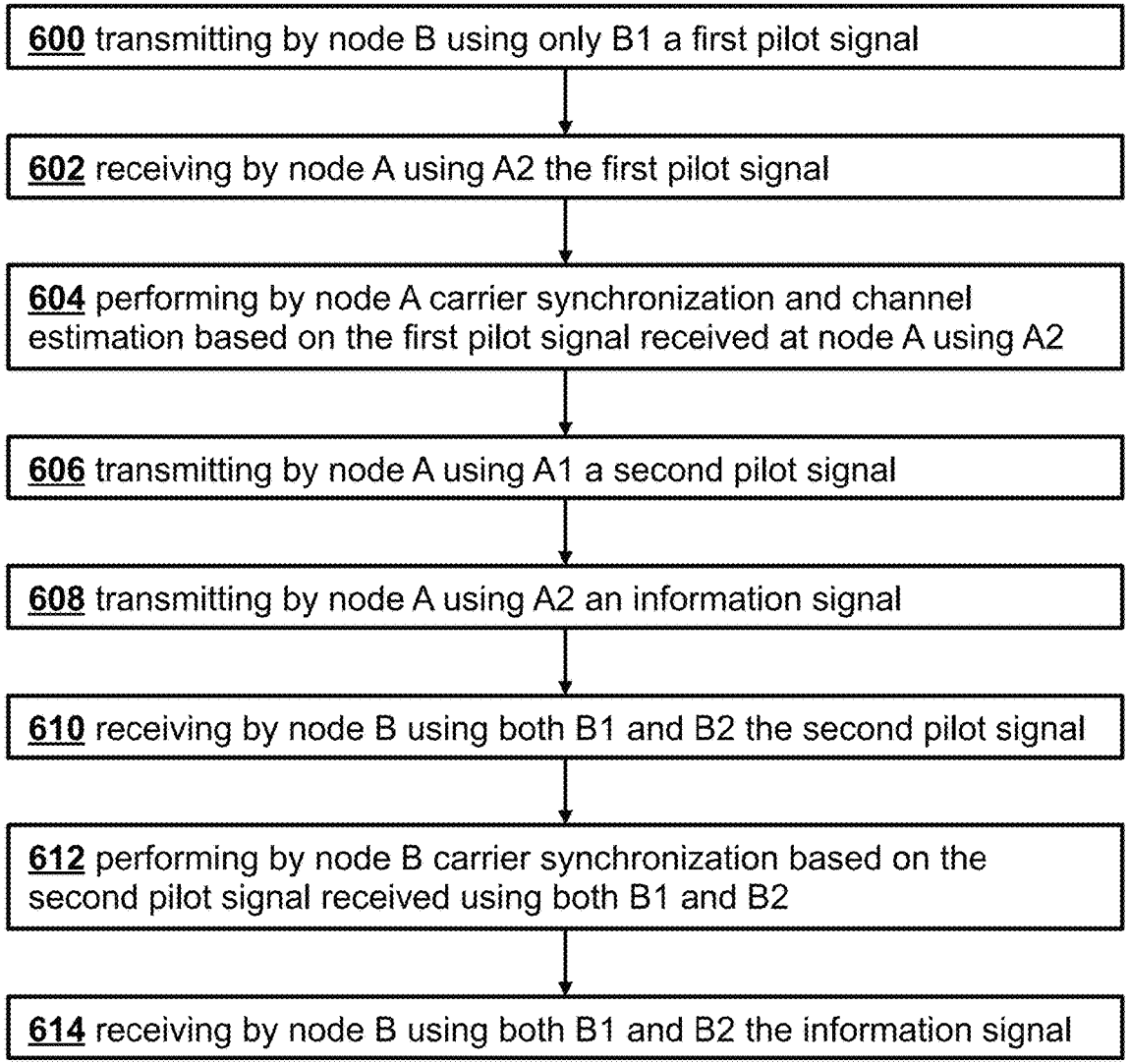
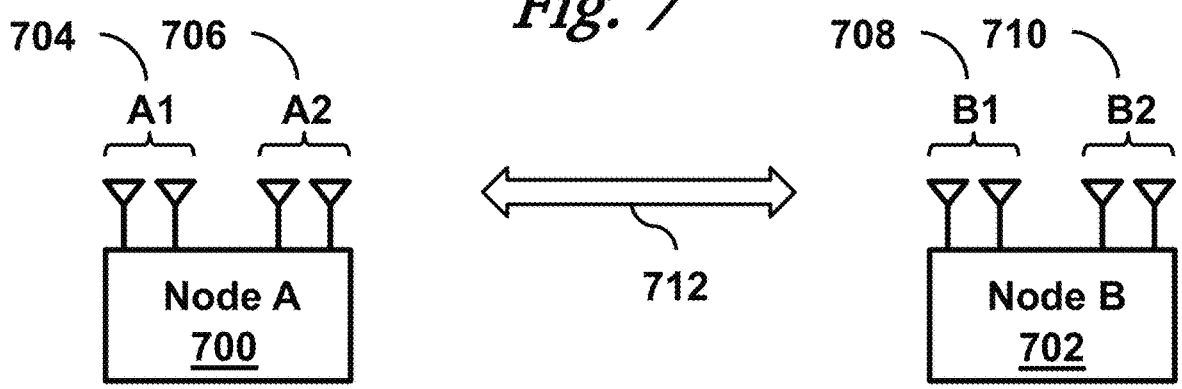

ANTI-EAVESDROPPING USING SMART PILOTING, MULTIPLE TRANSMIT ANTENNAS AND TRANSMIT BEAMFORMING

CROSS-REFERENCE TO RELATED APPLICATIONS

This application claims priority from US Provisional Patent Application 63/390,539 filed Jul. 19, 2022, which is incorporated herein by reference.

STATEMENT REGARDING FEDERALLY SPONSORED RESEARCH OR DEVELOPMENT

This invention was made with Government support under contracts W911NF-17-1-0581 and W911NF2020267 awarded by the US Department of the Army—Army Research Office. The Government has certain rights in the invention.

FIELD OF THE INVENTION

The present invention relates generally to wireless communications. More specifically, it relates to techniques for physical layer security in wireless communication networks.

BACKGROUND OF THE INVENTION

In wireless communication networks, it is often important to ensure private information transmission between two radio nodes in a wireless network. Cryptography is the most common technique for ensuring data privacy over wireless networks. In some circumstances, however, cryptographic techniques are not strong enough or are potentially vulnerable. For these and other reasons, there remains a need to provide additional security, such as physical layer security, to the communication channel between wireless nodes.

Existing techniques for physical layer security in wireless communication networks include using artificial noise from transmitter and transmit beamforming. These techniques, however, cannot handle eavesdroppers with a relatively large number of antennas. Existing techniques for transmission from one node to another without a pilot from the transmitting node do not work for wireless communications at high frequencies such as MHz and GHz. The methods based on full-duplex radios are limited to short range communications due to self-interference.

BRIEF SUMMARY OF THE INVENTION

Techniques disclosed herein overcome the shortcomings and limitations of existing techniques for physical layer security in wireless communication networks.

The techniques disclosed herein allow one radio node (Alice) with more than one antenna to transmit secret information to another radio node (Bob) even if the eavesdroppers have unlimited numbers of antennas and are located virtually anywhere. The technique is implemented in three phases (time windows). In phase 1, Bob sends a pilot (possibly along with other public information) so that Alice can perform carrier synchronization and estimate the reciprocal wireless channel between the two nodes. In phase 2, Alice sends a pilot (possibly along with other public information) via one of her antennas so that Bob can perform carrier synchronization. In phase 3, which is perfectly synchronized with phase 2 at the carrier level, Alice uses transmit beamforming to send secret information via her other antennas. Because of the transmit beamforming from Alice, Bob is able to detect all the secret information from Alice. But because Alice does not send any pilot (or other public information) via the other antennas, eavesdropping (Eve) is unable to obtain the channel state information from the other antennas of Alice to Eve, and hence there is always a secret against Eve regardless of the number of antennas on Eve.

This technique includes a smart piloting between two legitimate radio nodes so that both can perform carrier synchronization and required channel estimation but any unintended receiver cannot perform required channel estimation relative to the antennas from which the secret information is transmitted. The scheme maintains a positive secrecy against any unintended receiver located virtually anywhere and/or equipped with any number of antennas. This scheme is the first with the above properties.

The techniques have applications to security of wireless networks, including Internet of Things, drone networks, vehicle to vehicle communications, etc.

In one aspect, the invention provides a method for wireless communication between a node A and a node B of a wireless network, wherein the node A has a first set of antennas A1 and a second set of antennas A2, wherein A1 and A2 are disjoint sets, and wherein A1 and A2 each contains at least one antenna; wherein the node B has a first set of antennas B1 and a second set of antennas B2, wherein B1 and B2 are disjoint sets, wherein B1 contains at least one antenna, and wherein B2 contains none, one, or multiple antennas; the method comprising: transmitting by the node B using only B1 a first pilot signal; receiving by the node A using A2 the first pilot signal; performing by the node A carrier synchronization and channel estimation based on the first pilot signal received at the node A using A2; transmitting by the node A using A1 a second pilot signal; transmitting by the node A using A2 an information signal; receiving by the node B using both B1 and B2 the second pilot signal; performing by the node B carrier synchronization based on the second pilot signal received using both B1 and B2; and receiving by the node B using both B1 and B2 the information signal.

Preferably, the node A of the wireless network comprises a half-duplex radio, and wherein all the transmitting steps and all the receiving steps are performed with the half-duplex radio, and the node B of the wireless network comprises a half-duplex radio, and wherein all the transmitting steps and all the receiving steps are performed with the half-duplex radio.

Preferably, receiving by the node A the first pilot signal uses both A1 and A2; and performing by the node A carrier synchronization and channel estimation is based on the first pilot signal received at the node A using both A1 and A2; Preferably, transmitting the information signal by the node A and transmitting the second pilot signal by node A use the same transmit carrier and so are synchronized at the carrier level. Preferably, transmitting the information signal by the node A is performed immediately following transmitting the second pilot signal by the node A. Preferably, transmitting by the node A using A2 the information signal uses transmit beamforming.

The first pilot signal and the second pilot signal may be different types of pilots, or identical types of pilots. The second set of antennas B2 may be an empty set containing no antennas, or may be a non-empty set containing one or more antennas.

BRIEF DESCRIPTION OF THE SEVERAL VIEWS OF THE DRAWINGS

FIG. 6 is a flowchart providing an overview of the steps of ANECE-3, a scheme for anti-eavesdropping channel estimation according to an embodiment of the invention.

FIG. 7 is a schematic diagram illustrating components of a system that may be used to implement ANECE-3, according to an embodiment of the invention.

DETAILED DESCRIPTION OF THE INVENTION

Figure 1:
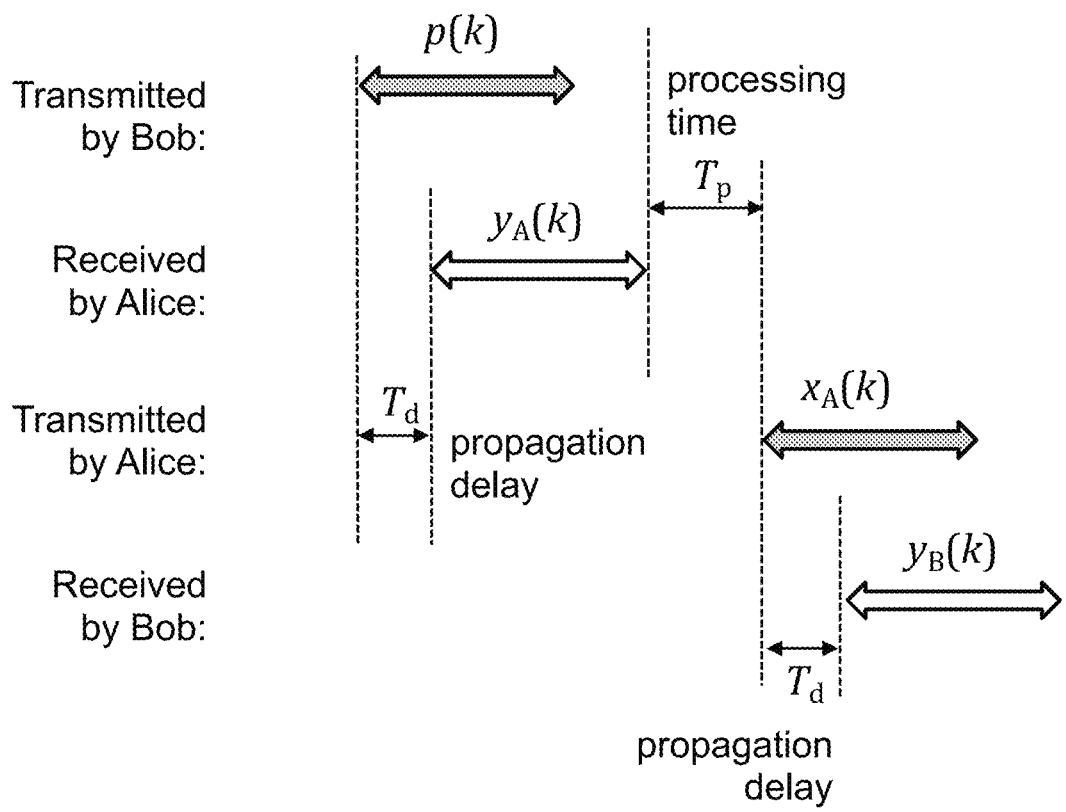
FIG. 1 illustrates a known scheme for discriminative channel estimation using half-duplex radios for information transmission from Alice to Bob. Due to the lack of a pilot, the receiver (Bob) cannot perform carrier synchronization with the transmitter (Alice).

Embodiments of the present invention provide a scheme of anti-eavesdropping channel estimation (ANECE) using multi-antenna half-duplex radios. As shown in FIG. 7 the method for wireless communication is implemented between a node A 700 (also referred to as Alice) and a node B 702 (also referred to as Bob) of a wireless network, where radio signals 712 are transmitted between the nodes. Alice 700 has a first set of antennas A1 704 and a second set of antennas A2 706 which are disjoint sets (i.e., have no antenna in common). In addition, A1 and A2 each contains at least one antenna. Bob 702 has a first set of antennas B1 700 and a second set of antennas B2 700, which are disjoint sets. B1 contains at least one antenna, and B2 may contain none, one, or multiple antennas.

This scheme has three phases of communication between two radio nodes (Alice and Bob), which are outlined in FIG. 6. Phase 1 has three steps: In step 600 Bob sends out a pilot via one of his antennas in B1, in step 602 Alice receives the pilot signal using A2 (and optionally A1), and in step 604 Alice carries out carrier synchronization and channel estimation. In phase 2, step 606, Alice sends out a pilot signal using A1, which will allow Bob to receive the pilot in step 610 and carry out carrier synchronization and channel estimation in step 612. In phase 3, step 608, which is perfectly synchronized with phase 2, step 606, Alice applies transmit beamforming and sends out a stream of information via her other antennas A2. Bob then receives the information signal in step 614.

To understand and appreciate this technique for physical layer security, it will be helpful to back up and review the state of the art in information security for wireless communication networks. There are many situations where physical layer security is needed in addition to cryptography based security implemented at higher layers. One of the key strategies for physical layer security is to prevent eavesdroppers/adversaries from getting their receive channel state information with respect to a source node transmitting secret information.

In contrast to anti-eavesdropping channel estimation (ANECE), techniques such as discriminative channel estimation (DCE) and conjugate and return send either no pilot or a very noisy pilot from a node which needs to send a secret information or a random sequence. As discussed later below, this approach cannot work due to failure of carrier synchronization without pilot.

Existing techniques for ANECE, referred to as ANECE-1 here, exploit a unique property of full-duplex radios by letting two or more cooperative nodes transmit concurrently to each other specially designed pilots. These pilots prevent eavesdroppers from obtaining consistent estimates of their receive channel state information, but at the same time allow each cooperative node to obtain its consistent channel estimation. As will be discussed later, these ANECE-1 techniques have problems.

Here, we present and analyze a modification of ANECE-1, referred to here as ANECE-2, for antenna-isolation based full-duplex radios. Such full-duplex radios are easier to implement than those based on radio frequency (RF) circulator on each full-duplex antenna. More importantly, with a careful examination of ANECE-2, we discover a surprising result referred to here as ANECE-3.

ANECE-3 uses only half-duplex radios although one of the two cooperative nodes needs to have more than one antenna. ANECE-3 has three phases. In phase 1, one node (Bob) sends a pilot via one of his antennas, which allows the other node (Alice) to perform channel estimation. In phases 2 and 3, respectively, Alice sends a pilot and a stream of symbols with perfect synchronization between them. But in phase 2, Alice uses one of her antennas while in phase 3 she uses the other antennas. ANECE-3 appears to be the only known scheme that can achieve the purpose of ANECE while using only half-duplex radios without the issue of carrier synchronization.

We now analyze these various ANECE techniques in more detail. Techniques exist for (discriminative) channel estimation between a pair of legitimate transceivers (Alice and Bob) and, at the same time, preventing eavesdropper (Eve) from estimating successfully its receive channel state information. In these existing techniques, the (implicit) assumption that if a (radio) transmitter transmits a baseband random signal r(k) without a pilot or with a however noisy pilot, any receiver can successfully conduct a carrier (frequency and phase) synchronization and the following standard baseband channel model applies:

$$y(k)=Qr(k)+n(k) \quad (1)$$

where y(k) is the (demodulated) baseband representation of the signal received by the receiver, Q is supposed to be a time-invariant channel gain within each channel coherence period, and n(k) is the channel noise. (In this paper, all symbols like n(k), n(k) and N represent the noise terms.)

The above assumption, however, is incorrect. Without knowing any of the symbols transmitted within an independent transmission session, the receiver has no way to calibrate its radio carrier phase (to say the least) with respect to the transmitter. This means that without a pilot, Q would vary randomly from one transmission session to another even within the same (antenna-to-antenna) channel coherence period. In general, without a pilot, the signal received by a receiver (after demodulation) should have the following form $$y(k)=\eta h e^{j\theta+j\Delta_f k}r(k)+n(k) \quad (2)$$

where h is invariant within a coherence period, $\Delta_f$ is proportional to the difference of the carrier frequencies at transmitter and receiver, and $\eta$ and $\theta$ can be random from one transmission to another within the same (antenna-to-antenna) coherence period. The incorrect assumption behind these existing approaches makes their schemes impossible to implement. An ideal phase-locked-loop could make $\Delta_f=0$ but still leaves $\theta$ completely unknown.

To be more specific, FIG. 1 illustrates a key example of prior ideas for discriminative channel estimation using half-duplex radios for (secret) information transmission from A1-ice to Bob. This idea does not work because the receiver (Bob) cannot perform carrier synchronization with the transmitter (Alice) due to lack of pilot.

Here, Bob (with a single antenna) first sends a pilot p(k) with k=1, ..., $K_1$, and then Alice (with multiple antennas) receives $$y_A(k)=hp(k)+n_A(k) \quad (3)$$

with k=1, ..., $K_1$. With a sufficient SNR in $y_A(k)$, Alice is able to accurately estimate h, which is the reciprocal channel vector between Alice and Bob. Then Alice sends out $x_A(k)=1/\|h\|h^*s(k)$ with k=1, ..., $K_2$ where s(k) is a sequence of information symbols meant for Bob. If Bob's carrier is synchronized with Alice's, then the (demodulated baseband) signal received by Bob is $$y_B(k)=h^T x_A(k)+n_B(k)=\|h\|s(k)+n_B(k) \quad (4)$$

with k=1, ..., $K_2$. Given this $y_B(k)$, Bob would be able to detect the information in s(k) (assuming phase-shift-keying) without the knowledge of h.

However, if Bob does not know any of s(k) in $x_A(k)$, then Bob is not able to synchronize with Alice at least in terms of carrier phase (if we assume that Alice and Bob have their radio frequency oscillators with perfectly matched frequencies). Note that $x_A(k)$ is transmitted by Alice starting at a time unknown to Bob. A distributed synchronization is virtually impossible at a precision equal to a small fraction of the period of a radio frequency (MHz or higher).

If there is an embedded pilot in s(k) to help Bob to perform synchronization, then that symbol also allows Eve to estimate her (effective) channel vector $g=G1/\|h\|h^*$ in her received signal:

$$y_E(k)=Gx_A(k)+n_E(k)=gs(k)+n_E(k) \quad (5)$$

where G is the channel matrix from Alice to Eve. With the knowledge of g, all other symbols in s(k) are virtually exposed especially if Eve has a large number ($N_E$) of antennas. Here g has the dimension $N_E \times 1$.

ANECE-1: Using Ideal Full-Duplex Radios

We now review the principle of anti-eavesdropping channel estimation (ANECE-1) using a pair of ideal full-duplex radios, as known in the current state of the art. For simplicity, we consider the case where Alice and Bob are each a single-antenna full-duplex radio. The objective of ANECE is the same as that of the prior works discussed previously. But an important feature of ANECE is that every session of transmission from each node has a pilot. This ensures that the corresponding receiver is always in synch with the transmitter at the carrier level and hence the standard baseband channel model applies. Note that since Alice and Bob are full-duplex, each of them can serve as a transmitter and a receiver at the same time on the same carrier frequency.

Figure 2:
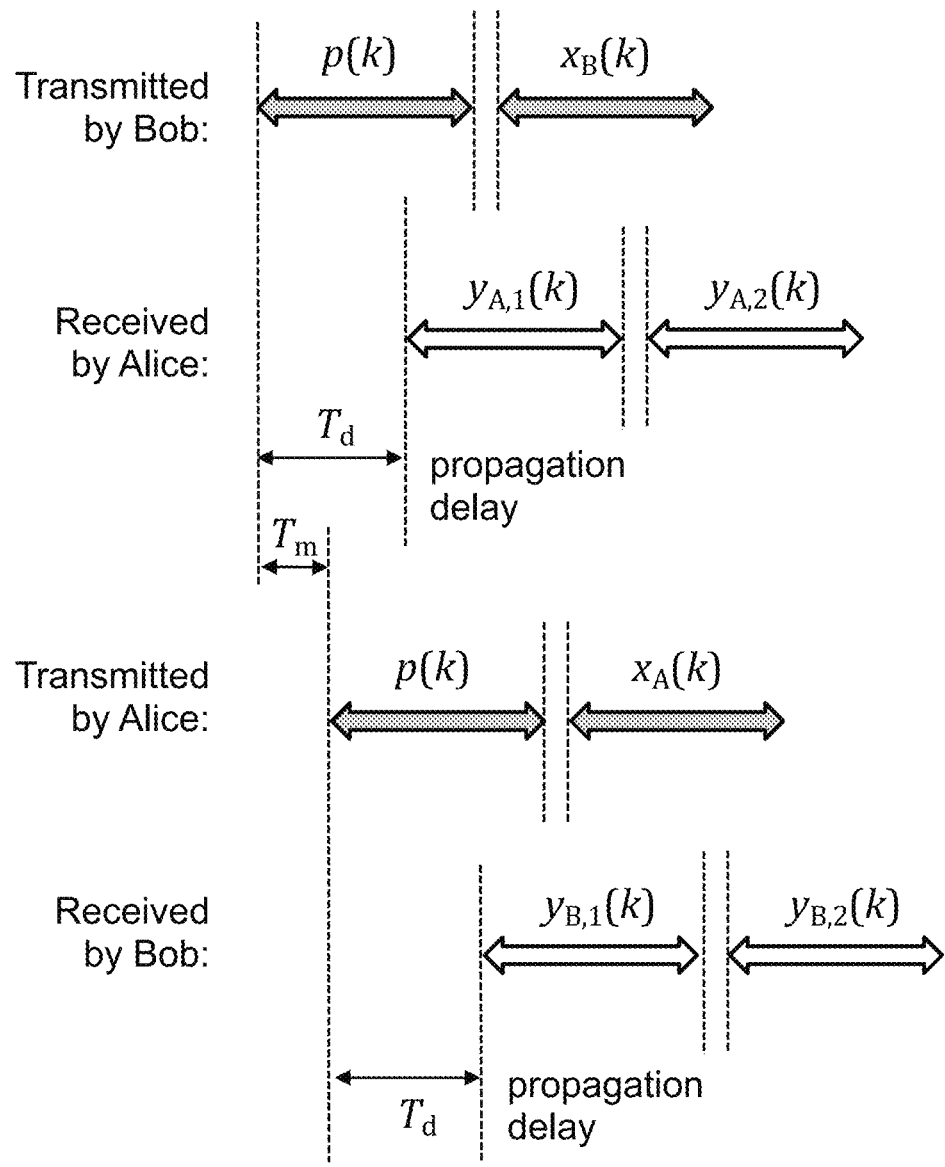
FIG. 2 illustrates a first known scheme for anti-eavesdropping channel estimation (ANECE-1).

Specifically, as illustrated in FIG. 2, Alice and Bob transmit their packets at about the same time. Each packet has two parts that are in perfect synch with each other. Part 1 of each packet is a pilot sequence p(k), k=1, 2, ..., $K_1$. The same pilot is applied by both Alice and Bob. Part 2 of the packet from Alice is $x_A(k)$, k=1, 2, ..., $K_2$, and part 2 of the packet from Bob is $x_B(k)$, k=1, 2, ..., $K_2$. The best choice of p(k) (for the case of just two users) is a constant sequence, i.e., p(k) is invariant to k=1, ..., $K_1$. The constant pilot makes the concurrent transmissions from Alice and Bob feasible (if not too easy) to implement since the required precision $T_m$ for the concurrence is any small fraction of $K_1 T_s$ with $T_s$ being the symbol interval.

The (baseband) signals received by Alice and Bob, in parts 1 and 2, are respectively: $y_{A,1}(k)=hp(k)+n_{A,1}(k)$, $y_{A,2}(k)=hx_B(k)+n_{A,2}(k)$, $y_{B,1}(k)=hp(k)+n_{B,1}(k)$ and $y_{B,2}(k)=hx_A(k)+n_{B,2}(k)$, where h is the reciprocal channel gain between Alice and Bob. Note that since the pilot p(k) is known to both Alice and Bob and the two parts of each transmission are in perfect synch, the carrier synchronization is not an issue for both Alice and Bob in both parts of each transmission.

Based on $y_{A,1}(k)$, Alice can estimate h. Then based on $y_{A,2}(k)$, Alice can detect the information in $x_B(k)$. Similarly, Bob can estimate h and then detect the information in $x_A(k)$. If one of the two sequences $x_A(k)$ and $x_B(k)$ is zero, then there is just a one-way information transmission, but the two pilots must be transmitted still as explained below.

Effect of ANECE-1 on Eve

The signals received by Eve with $N_E$ antennas, corresponding to the concurrent transmissions from Alice and Bob, are (in baseband):

$$y_{E,1}(k)=(g_A+g_B)p(k)+n_{E,1}(k) \quad (6)$$

$$y_{E,2}(k)=g_A x_A(k)+g_B x_B(k)+n_{E,2}(k) \quad (7)$$

where $g_A$ and $g_B$ are Eve's receive channel vectors with respect to Alice and Bob respectively. Based on the knowledge of {p(k), k=1, ..., $K_1$}, {$y_{E,1}(k)$, k=1, ..., $K_1$} and {$y_{E,2}(k)$, k=1, ..., $K_2$}, Eve is unable to obtain a consistent estimate of $g_A$ and $g_B$, and hence unable to detect all the information in $x_A(k)$ and $x_B(k)$ even if $n_{E,1}(k)=n_{E,2}(k)=0$ and/or $N_E \to \infty$.

Note that if Eve is much closer to Alice than to Bob, then $g_A+g_B \approx g_A$. In this case, Eve may obtain $g_A$ and hence detect all information in $x_A(k)$. But this Eve is completely blind to $g_B$ and unable to detect all information in $x_B(k)$.

In many situations, it is possible to keep Eve at comparable distances with respect to both Alice and Bob. This is equivalent to keep the distance between Alice and Bon relatively small compared to other potential receivers in the field.

The above principle of ANECE has been extended to cases where there are more than two legitimate users and each user may have multiple antennas. But our interest in this paper is to re-examine the requirements for ANECE and present a simplified ANECE with fewer requirements.

Limitations of Full-Duplex Radios

The key requirement for these ANECE techniques is full-duplex radio. Although each antenna (connected to a RF circulator) can be made full-duplex in principle, the performance of such a full-duplex radio is limited. The performance can be measured by the ratio $\rho_0$ of the residual self-interference (RSI) power over the transmitted power. To understand the role of $\rho_0$ in ANECE, let us consider the SNR of $y_{A,1}(k)$ where $n_{A,1}(k)$ contains both RSI and the normal channel noise. It follows that $$SNR_{A,1} = \frac{|h|^2 P_p}{\sigma_n^2 + \rho_0 P_p} \quad (8)$$

where $P_p$ is the power of the pilot $p(k)$, $\rho_0 P_p$ is the residual self-interference power, and $\sigma_n^2$ is the normal channel noise variance. We can also write $$h = \frac{\tilde{h}}{d^{\alpha/2}}$$

where d is the distance between Alice and Bob, $\alpha > 2$ the power exponent of the large scale fading, and $\tilde{h}$ the small-scale fading. It is often to model $\tilde{h}$ as a complex circular Gaussian random variable CN(0, 1) for fading environment or to choose $\tilde{h}=1$ for non-fading environment. It follows that $$SNR_{A,1} = \frac{|\tilde{h}|^2 \bar{P}_p}{\sigma_n^2 + \rho \bar{P}_p} \quad (9)$$

with $\bar{P}_p = P_p / d^\alpha$ being the normalized pilot power, and $\rho = d^\alpha \rho_0$ the normalized RSI power gain. We see that $\rho$ can be larger than one although we know $\rho_0 < 1$.

For a near-ideal performance of full-duplex, we need $\rho \bar{P}_p \ll \sigma_n^2$ (see the denominator of (9)) or equivalently $$d^\alpha \ll \frac{1}{\rho_0 SNR_p} \quad (10)$$

with $$SNR_p = \frac{\bar{P}_p}{\sigma_n^2}.$$

In this case, the variance of the least square estimation of $\tilde{h}$ from $\{y_{A,1}(k), k=1, \ldots, K_1\}$ can be shown to be $$\sigma_{\Delta \tilde{h}}^2 = \frac{1}{K_1 SNR_p}.$$

We see that for a given set of $\rho_0$, $\sigma_{\Delta \tilde{h}}^2$ and $K_1$, there is a corresponding upper bound on the distance d in order for Alice and Bob to have a near-ideal performance of full-duplex.

In practice, the value of $\rho_0$ depends on how the full-duplex radio is designed. The best (smallest) value of $\rho_0$ is typically achieved by using antenna isolation. Specifically, if a node has two antennas, we can let one of the two antennas transmit and the other antenna receive. With a proper isolation between the two antennas, the cross-antenna interference can be substantially reduced even before any steps of self-interference cancellation (SIC) take place.

ANECE-2: Using Antenna-Isolation Based Full-Duplex Radios

We now present a modification of ANECE, which uses antenna-isolation based full-duplex radios. We consider a channel between Alice with $N_A$ antennas and Bob with $N_B$ antennas. Let one of the antennas at Alice be A1 and all other antennas at Alice be A2, and one of the antennas at Bob be B1 and all other antennas at Bob be B2. Assume that when A1 transmits, the cross-antenna interference from A1 to A2 (or self-interference at Alice) is minimum due to antenna isolation followed by self-interference cancellation. The same is assumed for B1 and B2. Due to the requirement of antenna isolation, we need $N_A \geq 2$ and $N_B \geq 2$.

Figure 3:
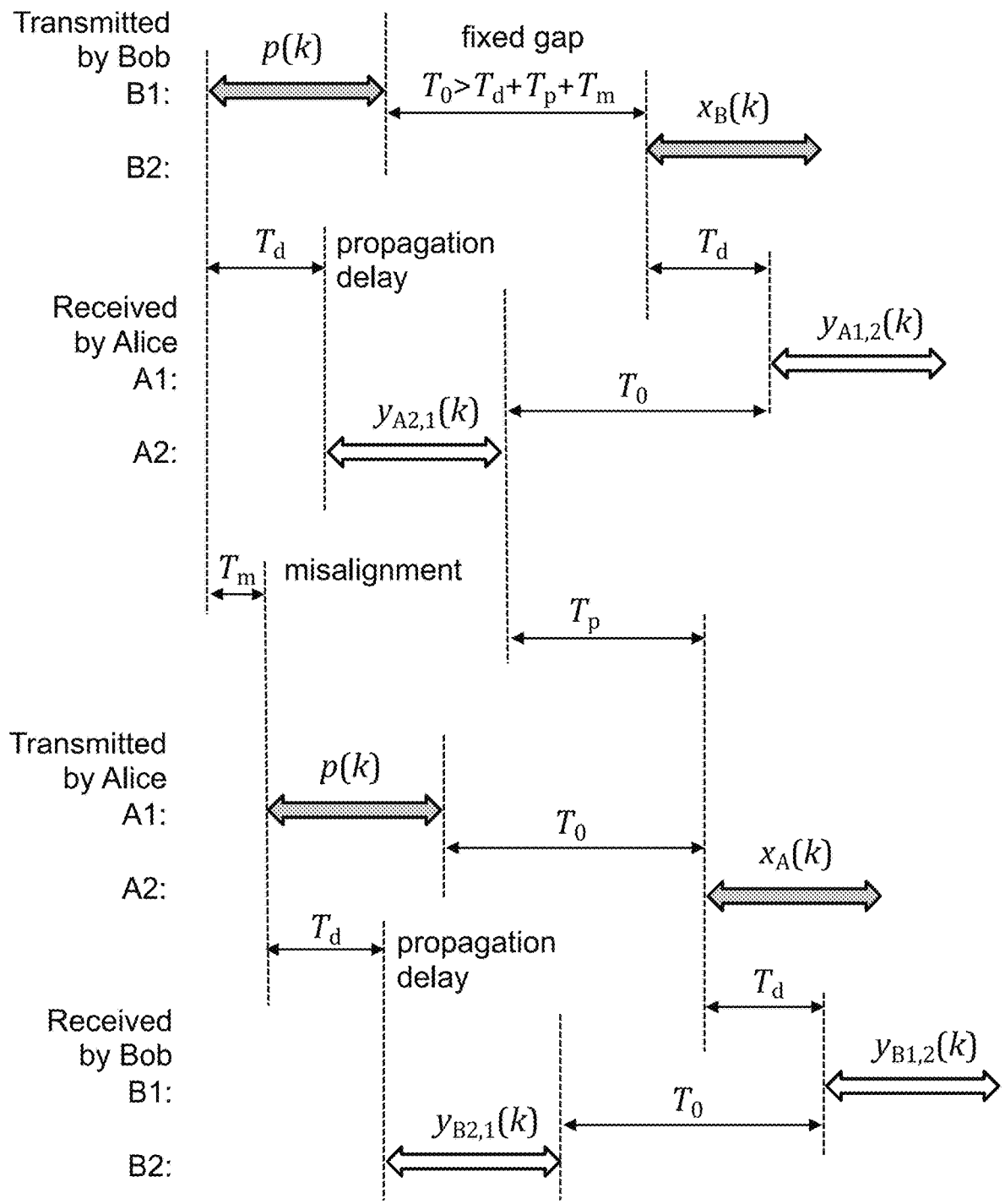
FIG. 3 illustrates a second scheme for anti-eavesdropping channel estimation (ANECE-2), which is a modification of ANECE-1 using antenna-isolation based full-duplex radios.

Like ANECE-1, ANECE-2 has two steps, as illustrated in FIG. 3. ANECE-2 is a modification of ANECE using antenna-isolation based full-duplex radios.

Step 1: Alice and Bob use their A1 and B1 respectively to transmit concurrently (at the symbol precision) the identical pilot sequences $p(k)$, $k=1, \ldots, K_1$. Consequently, Alice and Bob use their A2 and B2 respectively to receive the following signals:

$$y_{A2,1}(k) = h_{A2,B1} p(k) + n_{A2,1}(k) \quad (11)$$

$$y_{B2,1}(k) = h_{B2,A1} p(k) + n_{B2,1}(k) \quad (12)$$

where $k=1, \ldots, K_1$. Here $h_{A2,B1}$ is the channel vector from B1 to A2, which is typically independent from the channel vector $h_{B2,A1}$ from A1 to B2. With a sufficient energy in the pilot sequence, Alice and Bob can accurately estimate, respectively, $h_{A2,B1}$ and $h_{B2,A1}$.

Step 2: After a fixed gap $T_0$ (at the carrier precision) from its transmitted pilot, Alice uses A2 to transmit $$x_A(k) = \frac{1}{\|h_{A2,B1}\|} h_{A2,B1}^* s_A(k) \text{ for } k = 1,$$

$\ldots$, $K_2$. Similarly, Bob uses B2 to transmit $$x_B(k) = \frac{1}{\|h_{B2,A1}\|} h_{B2,A1}^* s_B(k) \text{ for } k = 1,$$

$\ldots$, $K_2$. Here, $s_A(k)$ and $s_B(k)$ are two sequences of information symbols, which are independent of each other. Consequently, Alice and Bob use their A1 and B1, respectively, to receive the following signals:

$$y_{A1,2}(k) = h_{A1,B2}^T x_B(k) + n_{A1,2}(k) \quad (13)$$
$$= \|h_{B2,A1}\| s_B(k) + n_{A1,2}(k)$$
$$y_{B1,2}(k) = h_{B1,A2}^T x_A(k) + n_{B1,2}(k) \quad (14)$$
$$= \|h_{A2,B1}\| s_A(k) + n_{B1,2}(k)$$

where $k=1, \ldots, K_2$. Here we have applied the reciprocal properties $h_{A1,B2} = h_{B2,A1}$ and $h_{B1,A2} = h_{A2,B1}$.

Even though $h_{B2,A1}$ is only known to Bob (and Alice does not know $\|h_{B2,A1}\|$), Alice can detect all information in $s_B(k)$ from $y_{A1,2}$ (assuming PSK symbols and sufficient SNR in $y_{A1,2}$) since the signal component in $y_{A1,2}$ is a positive scale of $s_B(k)$. The same applies to $y_{B1,2}(k)$ from which Bob can detect all information in $s_A(k)$.

It is important to note (see FIG. 3) that $T_0$ must be larger than the sum of $T_d$, $T_p$ and $T_m$, i.e., $T_0 > T_d + T_p + T_m$. Here, $T_d$ is the propagation delay between Alice and Bob, $T_p$ is a processing time needed from the reception of $y_{A2,1}(k)$ to the construction of $x_A(k)$, and $T_m$ is a time of misalignment between Alice and Bob. In principle, as long as there are known upper bounds on $T_d$, $T_p$ and $T_m$, for given applications, $T_0$ can be predetermined.

Furthermore, $T_0$ must be precisely controlled so that the receive carrier of each node remains synchronized with the transmit carrier of the other node throughout the two-step process. Specifically, we can think that each node has two virtual carriers: one for transmit and one for receive. For example, Bob uses his transmit carrier when he transmits the pilot p(k) via B1 in step 1, pauses for $T_0$ microseconds and then transmits the information sequence $x_B(k)$ via B2 in step 2. Correspondingly, Alice synchronizes her receive carrier with Bob's transmit carrier when she receives the pilot via A2 (from Bob) in step 1 and then applies her receive carrier to receive the information sequence via A1 (from Bob) in step 2. The same applies to the (concurrent) other way around between Alice and Bob.

Effect of ANECE-2 on Eve

When Alice and Bob transmit p(k) via A1 and B1 respectively, the eavesdropper (Eve) with $N_E$ antennas receives $$y_{E,1}(k)=(g_{E,A1}+g_{E,B1})p(k)+n_{E,1}(k) \quad (15)$$

where $g_{E,A1}$ and $g_{E,B1}$ are the channel vectors from A1 of Alice and B1 of Bob, respectively, to Eve. It is clear that Eve is unable to estimate $g_{E,A1}$ and $g_{E,B1}$ consistently from $y_{E,1}(k)$ When Alice and Bob transmit $x_A(k)$ and $x_B(k)$ via A2 and B2 respectively, Eve receives $$y_{E,2}(k) = G_{E,A2}x_A(k) + G_{E,B2}x_B(k) + n_{E,2}(k) \quad (16)$$

$$= g_{E,A2}s_A(k) + g_{E,B2}s_B(k) + n_{E,2}(k)$$

with $$g_{E,A2} = G_{E,A2}\frac{1}{\|h_{A2,B1}\|}h^*_{A2,B1} \quad (17)$$

$$g_{E,B2} = G_{E,B2}\frac{1}{\|h_{B2,A1}\|}h^*_{B2,A1} \quad (18)$$

where $G_{E,A2}$ and $G_{E,B2}$ are the channel matrices from A2 of Alice and B2 of Bob, respectively, to Eve.

It is important to note that in scattering-rich environment, $h_{A2,B1}$, $h_{B2,A1}$, $g_{E,A1}$, $g_{E,B1}$, $G_{E,A2}$ and $G_{E,B2}$ are all independent of each other. This means that even if Eve could find the exact $g_{E,A1}$ and $g_{E,B1}$, this would be useless for Eve to detect the information in $s_A(k)$ and $s_B(k)$ from $y_{E,2}(k)$ (which is independent of $g_{E,A1}$ and $g_{E,B1}$).

The above observation means that a good alignment between the two pilots from Alice and Bob are not needed at all. Indeed, the two pilots could be significantly misaligned to even allow Eve to have a good estimate of both $g_{E,A1}$ and $g_{E,B1}$.

One-Way Information Transmission

If only one-way information transmission is conducted, one of the information sequences $s_A(k)$ and $s_B(k)$ (or equivalently $x_A(k)$ and $x_B(k)$) can be simply dropped (i.e., set to zero). In this case, can we also simply drop one of the two pilots? The answer is no. Both pilots are needed for the receive carrier of each node to be synchronized with the transmit carrier of the other node.

Figure 4:
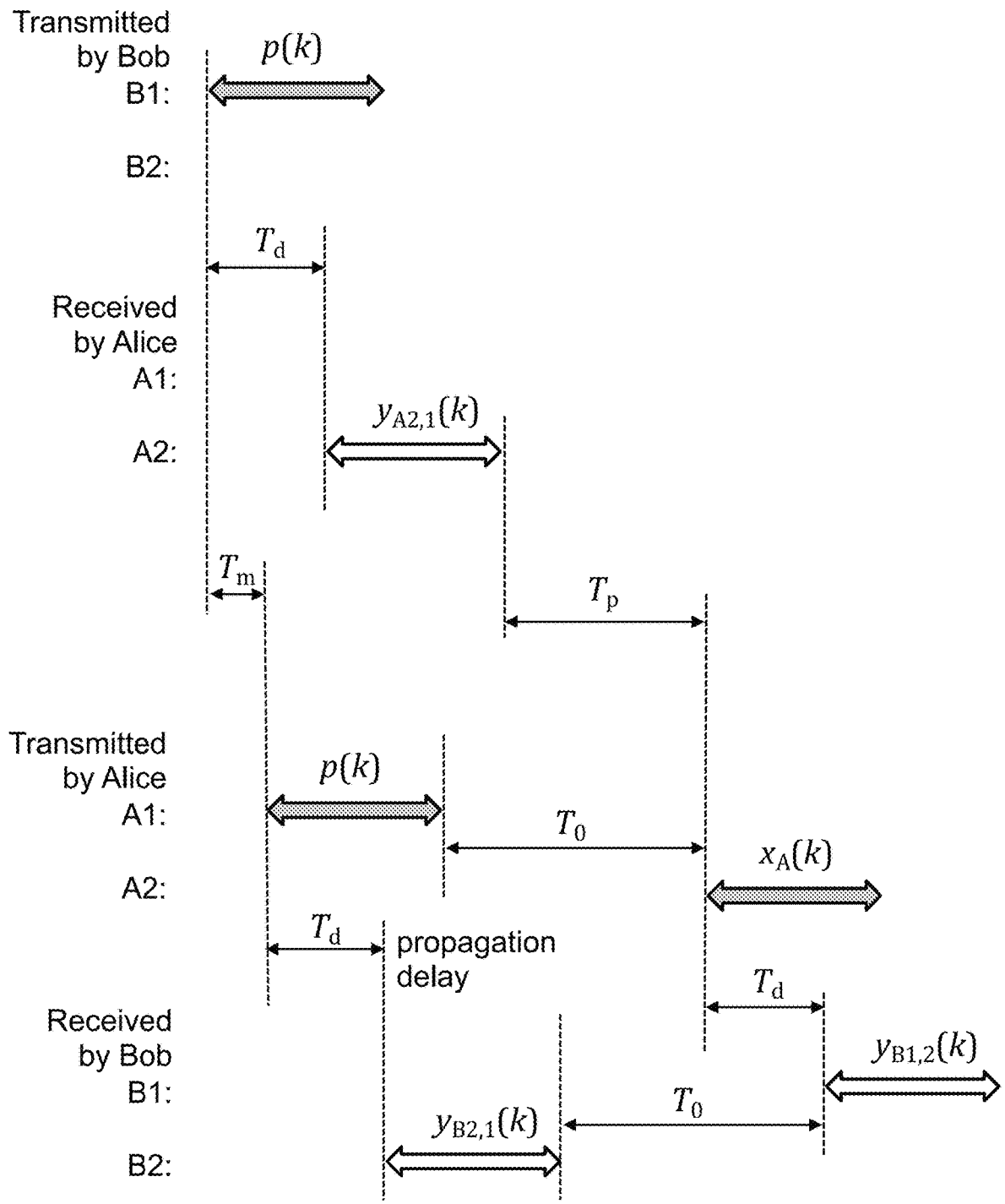
FIG. 4 illustrates a simplified version of ANECE-2 for the case where only Alice needs to send secret information to Bob.

If only Alice needs to send secret information to Bob, the scheme shown in FIG. 3 reduces to FIG. 4. Again, FIG. 4 results from FIG. 3 if only Alice transmits info to Bob. Here $T_0$ and $T_m$ are no longer constrained by each other. Here we see that there is no more constraint on the fixed gap $T_0$. To minimize the negative effect of drifting of carrier frequency and/or phase, we should minimize $T_0$, which leads to a surprising result shown in the next section.

ANECE-3: Using Multi-Antenna Half-Duplex Radios

Inspired by the analysis of ANECE-2 shown previously, we can increase $T_m$ to avoid the need of full-duplex radios, and also reduce $T_0$ to zero to optimize carrier synchronization.

Figure 5:
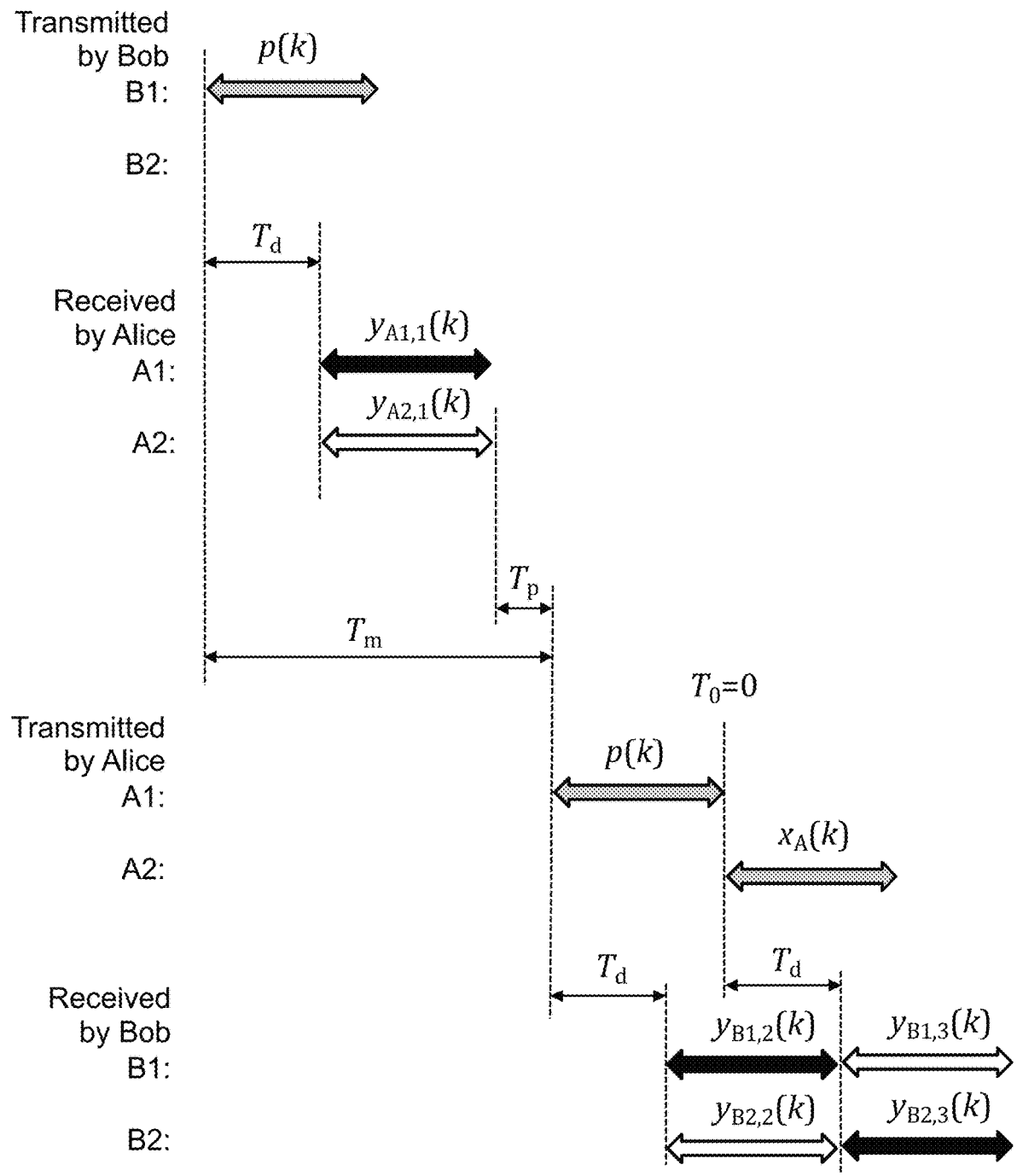
FIG. 5 illustrates ANECE-3, a scheme for anti-eavesdropping channel estimation according to an embodiment of the invention. ANECE-3 can be implemented using half-duplex radios.

FIG. 5 illustrates ANECE-3: A 3-phase ANECE scheme using half-duplex radios for information transmission from Alice to Bob. Here $y_{B2,2}(k)$ and $y_{B1,3}(k)$ correspond to $y_{B2,1}(k)$ and $y_{B1,2}(k)$ in ANECE-2.

As illustrated in FIG. 5, this scheme of ANECE for information transmission from Alice to Bob has three (orthogonal) phases of transmissions as discussed below.

In phase 1, Bob transmits a pilot p(k) via B1, and Alice receives the signal $y_{A2,1}(k)=h_{A2,B1}p(k)+n_{A2,1}(k)$ via A2. Alice then estimates $h_{A2,B1}$ from $y_{A2,1}(k)$ and prepares the construction of $$x_A(k) = \frac{1}{\|h_{A2,B1}\|}h^*_{A2,B1}s_A(k)$$

with $s_A(k)$ being the sequence of information symbols. Unlike ANECE-2, Alice also receives $y_{A1,1}(k)=h_{A1,B1}p(k)+n_{A1,1}(k)$ via A1 from which $h_{A1,B1}$ could be estimated. But Alice does not need the knowledge of $h_{A1,B1}$ in this scheme.

Both phases 2 and 3 are for transmissions from Alice, which however must be perfectly in synch using the same transmit carrier at Alice. Also, in phase 2, Alice transmits a pilot p(k) with k=1, ..., $K_2$ via A1, and in phase 3, Alice transmits $x_A(k)$ with k=1, ..., $K_3$ via A2. The transmission in phase 2 allows Bob to synchronize his receive carrier based on $y_{B1,2}(k)$ and $y_{B2,2}(k)$ received via B1 and B2. This in turn allows Bob to reliably receive $y_{B1,3}(k)$ and $y_{B2,3}(k)$ via B1 and B2 in phase 3. Since $y_{B1,3}(k)$ is equivalent to $y_{B1,2}(k)$ in (14), Bob is able to detect the information in $s_A(k)$ (assuming PSK).

Effect of ANECE-3 on Eve

The signals received by Eve in phases 2 and (3 from Alice are $$y_{E,2}(k)=g_{E,A1}p(k)+n_{E,2}(k), \quad (19)$$

$$y_{E,3}(k)=G_{E,A2}x_A(k)+n_{E,3}(k). \quad (20)$$

Since $g_{E,A1}$ is independent of $G_{E,A2}$, Eve is completely blind to $G_{E,A2}$ in $y_{E,3}(k)$. Equivalently, Eve is completely blind to $g_{E,A2}$ in the following:

$$y_{E,3}(k)=g_{E,A2}s_A(k)+n_{E,3}(k) \quad (21)$$

where $$g_{E,A2} = G_{E,A2}\frac{1}{\|h_{A2,B1}\|}h^*_{A2,B1}.$$

Remarks

We see that in ANECE-3 (for information transmission from Alice to Bob), Alice does not need to receive any signal via A1, i.e., A1 only serves as a transmit antenna to help Bob to perform carrier synchronization. Also the two pilots from Alice and Bob can be totally different from each other.

Compared to the (infeasible) scheme in FIG. 1, the critical difference here is the transmission of a pilot from Alice via A1 (one of her antennas) which is immediately followed by transmission of beamformed information via A2 (her other antennas). This design change is significant. (In theory, A1 could be more than one antennas as well.)

Further Analysis

Unlike ANECE-2, ANECE-3 allows Bob to receive signals via both B1 and B2 in each of phases 2 and 3. We will discuss next the roles of the additional received signals (shown as black arrows in FIG. 5). Define $$X_A = \begin{bmatrix} p(1), \ldots, p(K_2) & 0 \\ 0 & x_A(1), \ldots, x_A(K_3) \end{bmatrix} \quad (22)$$
$$= \begin{bmatrix} p^T & 0 \\ 0 & X \end{bmatrix},$$

$$H_{B,A} = \begin{bmatrix} h_{B1,A1} & h_{B1,A2}^T \\ h_{B2,A1} & H_{B2,A2} \end{bmatrix}, \quad (23)$$

and $$Y_B = [Y_{B,2}, Y_{B,3}] = \begin{bmatrix} y_{B1}(1), \ldots, y_{B1}(K_2+K_3) \\ y_{B2}(1), \ldots, y_{B2}(K_2+K_3) \end{bmatrix} \quad (24)$$

where $X_A$ is the $N_A \times (K_2+K_3)$ matrix of the signals transmitted by Alice in phases 2 and 3, $H_{B,A}$ is the $N_B \times N_A$ channel matrix from Alice to Bob, and $Y_B$ is the $N_B \times (K_2+K_3)$ matrix of the signals received by Bob in phases 2 and 3. Also $Y_{B,2}$ is the block of the first $K_2$ columns of $Y_B$, and $Y_{B,3}$ the block of the last $K_3$ columns of $Y_B$. It follows from $$Y_B = H_{B,A} X_A + N_B \text{ that} \quad (25)$$

$$Y_{B,2} = \begin{bmatrix} h_{B1,A1} p^T \\ h_{B2,A1} p^T \end{bmatrix} + N_{B,2},$$

and $$Y_{B,3} = \begin{bmatrix} h_{B1,A2}^T X \\ H_{B2,A2} X \end{bmatrix} + N_{B,3}. \quad (26)$$

It is clear that Bob can use all the RF waveforms associated with $Y_{B,2}$ (not just the signal $y_{B2,1}(k)$ shown in FIG. 4) for carrier synchronization. Bob can also estimate $h_{B1,A1}$ and $h_{B2,A1}$ from $Y_{B,2}$. However, the channel from Alice via A1 is not secure since Eve can also estimate her channel vector with respect to A1 of Alice. In ANECE-3, Alice sends no information via A1.

In $Y_{B,3}$ shown in (26), both $h_{B1,A2}^T$ and $H_{B2,A2}$ are unknown to Bob. But one can write that $$h_{B1,A2}^T X = \gamma s_A^T \quad (27)$$

with $\gamma = \|h_{B1,A2}\| = \|h_{A2,B1}\| > 0$ and $s_A^T = [s_A(1), \ldots, s_A(K_3)]$. And also $$H_{B2,A2} X = v s_A^T \quad (28)$$

with $$v = H_{B2,A2} \frac{1}{\|h_{A2,B1}\|} h_{A2,B1}^*$$

being a complex vector unknown to Bob. Equivalently, one can write $$Y_{B,3} = \begin{bmatrix} \gamma \\ v \end{bmatrix} s_A^T + N_{B,3} \quad (29)$$

We can show that if $K_3 \geq 2$ and $s_A^T = [s_A(1), \ldots, s_A(K_3)]$ consists of PSK symbols, then all $s_A(k)$, $\gamma$ and $v$ are uniquely identifiable from $Y_{B,3}$ asymptotically. Specifically, in the absence of noise and up to a positive scaling, $[\gamma, v^T]^T$ is the left principal singular vector of $Y_{B,3}$, and $s_A$ is the corresponding right singular vector of $Y_{B,3}$. Clearly, the optimal detection of $s_A$ should be based on all signals received by Bob. If the noise is white Gaussian, the optimal detection is the minimum distance detector, i.e., $$\min_{\gamma > 0, v, \|s_A\|^2 = K_3} \left\| Y_{B,3} - \begin{bmatrix} \gamma \\ v \end{bmatrix} s_A^T \right\|^2. \quad (30)$$

The principal singular vectors of $Y_{B,3}$ mentioned earlier can be used as the initial joint estimation of $\gamma$, $v$ and $s_A$. For optimal performance, an iterative search of the above optimization problem can be conducted where $s_A(k) \forall k$ are subject to PSK (or any QAM if $\gamma$ is known).

If SNR of the signal (i.e., $y_{B1,3}(k) = \gamma s_A(k) + n_{B1,3}(k)$) received by Bob via B1 in phase 3, is sufficiently high, then Bob can reliably detect all information in $s_A(k)$ by using $y_{B1,3}(k)$ alone. However, using multiple antennas, Bob could perform blind beamforming on $Y_{B,3}$ to detect all information from Alice. In other words, ANECE-3 can yield a positive secrecy using just half-duplex radios against full-duplex adversaries who, with any number of antennas located virtually anywhere, perform both jamming and eavesdropping.

CONCLUSION

Herein we have described and analyzed a scheme of ANECE using multi-antenna half-duplex radios. If only half-duplex radios are available, this is the first feasible scheme that allows the legitimate users to conduct RF carrier synchronization, necessary channel estimation and detection of transmitted information, and at the same time completely prevents any eavesdropper at virtually any location from finding its channel state information relative to any transmit antenna where secret information is transmitted. This scheme also is easy to implement since there is no strict requirement of synchronization between two distributed radios. In application, all public information in a packet should be "lumped" with its pilot.

The invention claimed is:

1. A method for wireless communication between a node A and a node B of a wireless network, wherein the node A has a first set of antennas A1 and a second set of antennas A2, wherein A1 and A2 are disjoint sets, and wherein A1 and A2 each contains at least one antenna; wherein the node B has a first set of antennas B1 and a second set of antennas B2, wherein B1 and B2 are disjoint sets, wherein B1 contains at least one antenna, and wherein B2 contains none, one, or multiple antennas; the method comprising:
   (a) transmitting by the node B using only B1 a first pilot signal;
   (b) receiving by the node A using A2 the first pilot signal;
   (c) performing by the node A carrier synchronization and channel estimation based on the first pilot signal received at the node A using A2;
   (d) transmitting by the node A using A1 a second pilot signal;
   (e) transmitting by the node A using A2 an information signal;
   (f) receiving by the node B using both B1 and B2 the second pilot signal;

(g) performing by the node B carrier synchronization based on the second pilot signal received using both B1 and B2;
(h) receiving by the node B using both B1 and B2 the information signal.

2. The method of claim 1 wherein the node A of the wireless network comprises a half-duplex radio, and wherein all the transmitting steps and all the receiving steps are performed with the half-duplex radio.

3. The method of claim 1 wherein the node B of the wireless network comprises a half-duplex radio, and wherein all the transmitting steps and all the receiving steps are performed with the half-duplex radio.

4. The method of claim 1 wherein receiving by the node A the first pilot signal uses both A1 and A2; wherein performing by the node A carrier synchronization and channel estimation is based on the first pilot signal received at the node A using both A1 and A2.

5. The method of claim 1 wherein transmitting the information signal by the node A and transmitting the second pilot signal by node A use the same transmit carrier and so are synchronized at the carrier level.

6. The method of claim 1 wherein transmitting the information signal by the node A is performed immediately following transmitting the second pilot signal by the node A.

7. The method of claim 1 wherein transmitting by the node A using A2 the information signal uses transmit beamforming.

8. The method of claim 1 wherein the first pilot signal and the second pilot signal are different types of pilots.

9. The method of claim 1 wherein the first pilot signal and the second pilot signal are identical types of pilots.

10. The method of claim 1 wherein the second set of antennas B2 is an empty set containing no antennas.

11. The method of claim 1 wherein the second set of antennas B2 is a non-empty set containing one or more antennas.

12. A wireless communication system comprising: a node A and a node B; wherein the node A has a first set of antennas A1 and a second set of antennas A2, wherein A1 and A2 are disjoint sets, and wherein A1 and A2 each contains at least one antenna; wherein the node B has a first set of antennas B1 and a second set of antennas B2, wherein B1 and B2 are disjoint sets, wherein B1 contains at least one antenna, and wherein B2 contains none, one, or multiple antennas; wherein the node A and the node B are adapted to communicate using a protocol comprising:
(a) transmitting by the node B using only B1 a first pilot signal;
(b) receiving by the node A using A2 the first pilot signal;
(c) performing by the node A carrier synchronization and channel estimation based on the first pilot signal received at the node A using A2;
(d) transmitting by the node A using A1 a second pilot signal;
(e) transmitting by the node A using A2 an information signal;
(f) receiving by the node B using both B1 and B2 the second pilot signal;
(g) performing by the node B carrier synchronization based on the second pilot signal received using both B1 and B2;
(h) receiving by the node B using both B1 and B2 the information signal.

\* \* \* \* \*